United States Patent [19]

Müller

[11] 4,224,153
[45] * Sep. 23, 1980

[54] PROCESS AND A FILTER FOR FILTERING A LIQUID CONTAINING SOLIDS HAVING A SUBSTANTIALLY DIFFERENT SPECIFIC GRAVITY RELATIVE TO THE LIQUID

[75] Inventor: Hans Müller, Erlenbach, Switzerland

[73] Assignee: Chemap AG, Maennedorf, Switzerland

[*] Notice: The portion of the term of this patent subsequent to May 1, 1996, has been disclaimed.

[21] Appl. No.: 959,590

[22] Filed: Nov. 13, 1978

Related U.S. Application Data

[63] Continuation of Ser. No. 851,756, Nov. 15, 1977, Pat. No. 4,152,261.

[30] Foreign Application Priority Data

Dec. 24, 1976 [CH] Switzerland .................. 16363/76

[51] Int. Cl.² ........................................... B01D 33/26
[52] U.S. Cl. .................................. 210/780; 210/331; 210/359; 210/486
[58] Field of Search .................. 210/77, 78, 107, 161, 210/216, 258, 324, 327, 331, 343–347, 359, 360 R, 360 A, 369, 380 R, 486

[56] References Cited

U.S. PATENT DOCUMENTS

| | | | |
|---|---|---|---|
| 2,592,972 | 4/1952 | Strassheim | 210/347 |
| 2,593,707 | 4/1952 | Walker | 210/359 |
| 3,471,026 | 10/1969 | Riker | 210/327 |
| 3,512,647 | 5/1970 | Young | 210/331 |

Primary Examiner—Frank Sever
Attorney, Agent, or Firm—Michael J. Striker

[57] ABSTRACT

A process is provided for filtering a liquid containing solids having a substantially different specific gravity relative to the liquid. The process includes the steps of providing a filter element having a hollow interior communicating with an outlet and being bounded by a filter mesh, passing a liquid containing solids having a substantially different specific gravity relative to the liquid against the outside of the filter mesh so that the filtrate enters into the interior and leaves the filter element through the outlet, and establishing a pressure differential between the interior and the ambient space so as to form an elevated pressure within the interior of the filter element, thereby irregular filter cake formations of the solids are at least substantially avoided because of the pressure differential between the outside of the filter mesh and the hollow interior. A filter for performing this process is also provided.

4 Claims, 3 Drawing Figures

PROCESS AND A FILTER FOR FILTERING A LIQUID CONTAINING SOLIDS HAVING A SUBSTANTIALLY DIFFERENT SPECIFIC GRAVITY RELATIVE TO THE LIQUID

The present application is a continuation of my copending application Ser. No. 851,756 filed Nov. 15, 1977, now U.S. Pat. No. 4,152,261.

BACKGROUND OF THE INVENTION

This invention relates to a process and a filter for filtering solids from liquids, particularly when the solids and the liquids have substantially different specific gravities.

Processes and filters for filtering liquids are well known.

Problems occur with conventional techniques when the specific gravities of the substances to be separated are too disparate. When liquids having a light specific gravity are filtered with the use of the customary filter aids, it is again and again observed that the filter cake which becomes deposited on the filter forms ridge-like areas at the edges of the filter element. The ridge-like areas are the result of irregular deposition of solids forming the filter cake. Because of the irregular deposition of the filter cake, the filter aid is exhausted too early. This premature exhaustion is particularly unfortunate because the filter aid typically accounts for a high portion of the expense of filtering. Another disadvantage of the irregular deposition is the consequent tendency of the filter element to become unbalanced because of its non-uniform load. Still another significant disadvantage becomes apparent when there is an attempt to terminate filtration when filter cake attains a predetermined thickness. The ridges tend to prematurely terminate filtration since only the ridges are at the predetermined thickness.

The same phenomenon of ridges at the edges of the filter element is observed with the deposition of relatively heavy ion exchange resin powder in aqueous solutions. This problem is particularly important in the treatment of condensates being returned to power stations.

Generally, this phenomenon arises when the density variation between the liquid and the solids (such as the filter aid and the material forming the filter cake) exceeds a certain value. This value is largely dependent on the nature of the liquid-solid system. The distribution of the sizes of the granules of the solids and the sedimentation rate also play a crucial role in the filtration.

SUMMARY OF THE INVENTION

An object of the present invention is to provide a process and a filter in which the occurrence of the ridge-like zones at the edges of the filter element is obviated or at least substantially avoided.

In accordance with the inventive concept, the process includes the step of establishing a pressure differential between the interior of a filter element and the ambient space about the filter element in order to produce an elevated pressure within the interior of the filter element. Consequently, irregular filter cake formations of solids are at least substantially avoided because of this pressure differential between the outside of the filter element and the hollow interior. The filter provided to perform this process includes means for producing this elevated pressure within the interior of the filter element. Advantageously, this pressure differential-producing means is fitted at or against the filtrate outlet of the filter element so as to restrict access of the filtrate to this outlet, thereby increasing the pressure in the interior of the filter element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF A PREFERRED EMBODIMENT

Figure 1:
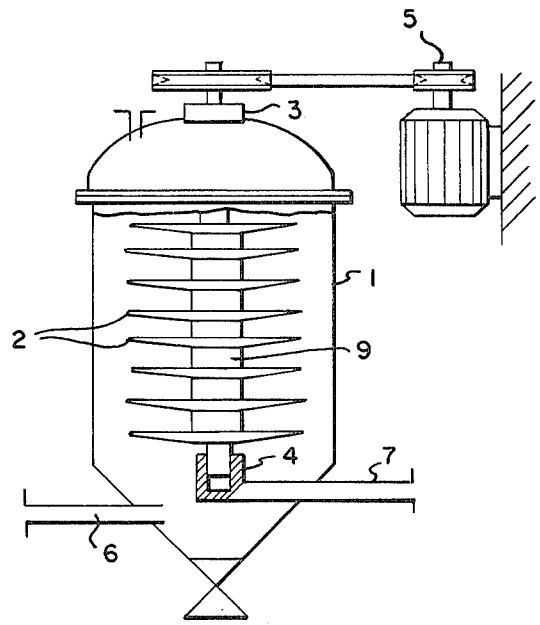
FIG. 1 shows a section of a centrifugal filter.

FIG. 1 shows a centrifugal filter including a filter vessel 1, a group of filters 2, a seal 3 at the top of the filter vessel, a seal 4 at a lower portion of the filter vessel, a drive 5, an inlet 6 for the liquid to be filtered and an outlet 7 for the filtrate.

Figure 2:
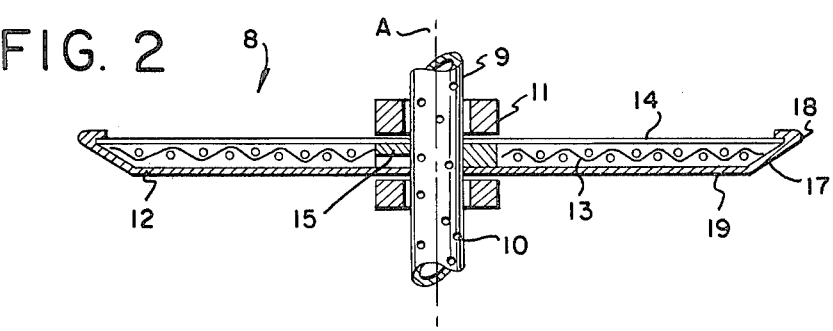
FIG. 2 shows a cross section of a filter element of the centrifugal filter.

FIG. 2 shows a single filter element 8 of the group of filters 2. This filter element 8 is fitted on a hollow shaft 9 lying on and defining an axis A and having bores 10. The individual filter elements 8 of the group 2 are spaced apart by spacer rings 11. Each filter element has a hollow interior defined by both a filter mesh 14 (generally including a filter cloth) extending radially from the shaft 9 and a bottom plate 12 having two portions, a first portion 19 extending radially from the shaft 9 and being spaced apart and preferably substantially parallel to the filter mesh 14, and a second portion 17 extending radially from the shaft 9 and also being upwardly inclined to as to meet the radially extending filter mesh 14 at a juncture 18. The filter mesh 14 and the bottom plate 12 are connected to each other only at this juncture 18. The hollow interior between the filter mesh 14 and the bottom plate 12 is defined by the spacing between the filter mesh 14 and the first portion 19, and the filter mesh 14 and those parts of the second portion 17 below juncture 18. This spacing is maintained by supporting element 13 (e.g., a wire mesh insert) which is positioned between the bottom plate 12 and the filter mesh 14.

Figure 3:
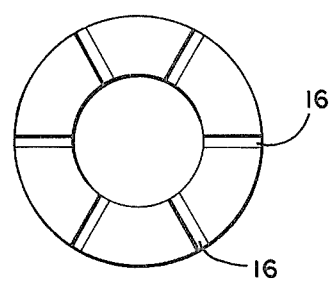
FIG. 3 shows a top view of an embodiment of pressure differential-producing means used to at least substantially avoid the ridge formations at the edges of a filter element.

Pressure differential-producing means are also provided within the hollow interior of the filter element 8. This means can be any obstruction which impedes passage of filtrate through the bores 10. As particularly illustrated in FIG. 3, this pressure differential-producing means can be a ring 15. This ring 15 can be made of synthetic resin, metal or elastic material. Ring 15 defines an inner periphery which is substantially equal to the outer periphery of the shaft 9, and therefore is fitted about shaft 9 at a location within the hollow interior. The ring 15 is provided with at least one and preferably a plurality of bores or grooves 16 which, in the position of the ring about the shaft 9, extend radially from the shaft 9.

To commence operation of the inventive filter and process, the liquid to be filtered is added to the filter vessel 1 through inlet 6. The solids, with or without a filter aid, are accumulated in the form of a cake on the filter mesh 14 and the filtrate passes through the filter mesh 14 into the hollow interior of the filter element 8 and leaves the filter element by passing through the grooves of the ring 15 and the bores 10 of the hollow shaft 9 and into the filtrate outlet 7.

The ring 15 can be provided with grooves of different sizes. The determination of the appropriate size or sizes must be empirically determined since the optimum pressure differential needed varies according to the particular kind of liquid-solid system being filtered. Ring 15 can be replaced by another ring having a different bore size(s) when the liquid-solid system being filtered is changed.

Preferably, the ring 15 has a sufficiently large size that all of the filtrate passing through the bores 10 must first pass through the grooves 16 of the ring 15. Alternatively, several rings could be employed to obtain the effect of such a ring of sufficiently large size.

The ring 15 may of course be fitted about the hollow shaft 9 in such a manner that not all of the bores 10 of the shaft 9 are blocked by non-grooved portions of the ring 15. Since the pressure differential to be achieved is corelated with the number of bores communicating with the hollow interior and with the number of bores communicating with the hollow interior through the grooves 16 of the ring 15, adjustment of this communication will influence the resultant pressure differential.

An advantage of the employment of these pressure differential-producing means is that the liquid can be filtered from solids under conditions in which there is a large difference between the specific gravities of each without the formation of the disadvantageous ridges of filter aid and solids developed at the edges of the filter element.

It will be understood that each of the elements described above, or two of more together, may also find a useful application in other types of a process and a filter for filtering a liquid containing solids having a substantially different specific gravity relative to the liquid differing from the types described above.

While the invention has been illustrated and described as embodied in a process and filter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A process for filtering a filtrant composed of a liquid which contains solids with a substantially different specific gravity relative to the liquid and having a tendency to generate irregular cake formations of solids on at least one filter element having a hollow interior within a filter mesh, the process comprising mounting all filter elements on a vertical hollow shaft having bores on a surface thereof arranged in communication with said interior of each filter elements and with an outlet of a vessel containing said filter element; passing the filtrant through all filter meshes into the interior of each filter element; passing the filtrant through said bores of said shaft to permit the filtrant to flow out of the vessel; and establishing a pressure differential between the ambient space surrounding each filter element and the interior of said shaft by independently rotatably mounting at least one means for changing differential pressure including flow-restricting member on the shaft for restricting flow passages between said interiors of each filter elements and said bores of said hollow shaft to provide an elevated pressure of an adjustable magnitude which is operative for substantially avoiding the cake formations on the filter elements.

2. A process as defined in claim 1, furthermore including the step of replacing said at least one flow-restricting member to change the extent to which said at least one bore is blocked.

3. A process as defined in claim 1, furthermore including the step of adjusting said at least one flow-restricting member to change the extent to which said at least one bore is blocked.

4. A filter for filtering a filtrant composed of a liquid which contains solids with a substantially different specific gravity relative to the liquid and having a tendency to generate irregular filter cake formations on a filter element, comprising a filter vessel including at least one generally horizontal filter element having an inlet constituted by a filter mesh at the upper side of the filter element, an impervious bottom plate affixed to said filter mesh, each filter mesh and said bottom plate constituting a hollow interior of each filter element, a hollow vertical shaft passing through and supporting each filter element, said hollow shaft associated with an outlet of said vessel and being formed with a plurality of perforating bores communicating with said hollow interiors of said filter elements and the interior of said shaft, at least one means for changing differential pressure including flow-restricting member independently rotatably mounted on said shaft within said hollow interior of each of said filter element, said flow-restricting member being arranged for partially blocking at least one of said bores so as to establish a pressure differential between the ambient space surrounding the filter elements and the interior of said shaft thereby providing an elevated pressure of a magnitude which is operative for substantially avoiding the filter cake formations of the surface of the filter elements.

* * * * *